(12) United States Patent
Chu

(10) Patent No.: US 8,540,149 B1
(45) Date of Patent: Sep. 24, 2013

(54) ACTIVE BARCODE AUTHENTICATION SYSTEM AND AUTHENTICATION METHOD THEREOF

(71) Applicant: Chun-Yu Chu, New Taipei (TW)

(72) Inventor: Chun-Yu Chu, New Taipei (TW)

( * ) Notice: Subject to any disclaimer, the term of this patent is extended or adjusted under 35 U.S.C. 154(b) by 0 days.

(21) Appl. No.: 13/657,269

(22) Filed: Oct. 22, 2012

(51) Int. Cl.
*G06K 5/00* (2006.01)

(52) U.S. Cl.
USPC .......................... 235/380; 235/487; 235/375

(58) Field of Classification Search
USPC .......................... 235/380, 375, 492, 451, 487
See application file for complete search history.

(56) References Cited

U.S. PATENT DOCUMENTS

2013/0080334 A1* 3/2013 Lee et al. ........................ 705/76
2013/0111208 A1* 5/2013 Sabin et al. .................... 713/171

* cited by examiner

*Primary Examiner* — Edwyn Labaze
(74) *Attorney, Agent, or Firm* — Ming Chow; Sinorica, LLC

(57) ABSTRACT

The present invention is to provide an active barcode authentication system and an authentication method thereof, which actively provides an encrypted message barcode and can fast and easily authenticate the ID of a user who holds a portable device, so that the avoidance that portable information is copied or stolen to cause fake conditions of trade, ID confirmation, membership card, access control, attendance, etc. can be made.

25 Claims, 5 Drawing Sheets

ACTIVE BARCODE AUTHENTICATION SYSTEM AND AUTHENTICATION METHOD THEREOF

BACKGROUND OF THE INVENTION

1. Field of the Invention

The present invention is related to an active barcode authentication system and an authentication method thereof, more particularly to an authentication system and an authentication method that can fast and simply authenticate a user holding a portable device so as to provide trade, access control, attendance, etc.

2. Description of the Prior Art

Nowadays, the technology of barcode is widely applied to all kinds of product packaging, logistics, information exchange is aspects as purchase and delivery order, document management, product packaging, application form, etc., but two problems of a limitation of maximum capacity of barcode and only one way to provide information still exist.

For general barcodes, the most are EAN, which is an international barcode system, Code 39, which can display 43 characters, UPC, which is uniformed code system in USA and is mainly applied in USA and Canada, Code 128, which can display 128 ASCII characters, Codabar, which is mostly used in the fields of medical and books, Interleaved 2 of 5, which only represents numbers, and is used in product packaging, warehouse and industry, and QR Code, wherein QR code is the barcode system that is mostly used. The main application of QR code is data transfer, transport address, telephone, etc., or to provide a quick link of a web site content. The content of the barcode records information that allows users to quickly link pages or fast dial. Presently, more enterprises start to use QR code for identification.

For the transmission of data, QR code is still with a problem of limitation of maximum capacity. Presently, barcode is constant without variety. Thus, once such barcode is cracked or intercepted, the information carried by the bar code will be easy to copy or steal, for transactions, access control, attendance, etc., such barcode cannot be count on. Hence, the technology of barcode must be improved.

Hence, to provide an active barcode authentication system and an authentication method that can actively provide an encrypted message barcode and fast authenticate a user holding a portable device shall be an important issue for the skilled people. Therefore, the avoidance that portable information is copied or stolen to cause fake conditions of trade, ID confirmation, membership card, access control, attendance, etc. can be made.

SUMMARY OF THE INVENTION

The main objective of the present invention is to provide an active barcode authentication system and an authentication method thereof, which actively provides an encrypted message barcode and can fast and easily authenticate the ID of a user who holds a portable device, so that the avoidance that portable information is copied or stolen to cause fake conditions of trade, ID confirmation, membership card, access control, attendance, etc. can be made.

The present invention discloses the active barcode authentication system and the authentication method thereof, wherein the active barcode authentication system that enables a store end to identify the ID of a user, wherein the store end has a store end key and a store end code, the system comprises: a barcode scanning device that reads plural barcodes; a portable device with a screen, the portable device having at least one barcode coding module, the barcode coding module codes a user ID code and a user encrypted message to at least one set of encrypted message barcodes and presents the set of encrypted message barcodes on the screen of the portable device, the screen of the portable device faces to the barcode scanning device in order to let the image of the set of encrypted message barcodes on the screen be captured by the barcode scanning device; an identification host that connects with the barcode scanning device for identifying the image captured by the barcode scanning device and then gaining the user ID code and the user encrypted message, the identification host has at least one encryption module and an SSL (secure socket layer) module, wherein the encryption module encrypts the user ID code, the user encrypted message and trade information provided by the store end to a store end encrypted message via the store end key; and an authentication host that connects with the identification host, the identification host transmits the store end code and the store end encrypted message to the authentication host through the SSL module, the authentication host has a decoding module and a verifying module, wherein the decoding module decodes the store end encrypted message and the user encrypted message for gaining the initial information before encryption of the user and the verifying module is to verify whether the user conforms to the conditions of trade and authentication or not.

Physically, the portable device further comprises an encryption module, the encryption module is able to encrypt a password, a user unique identification code, a time marker, and an authentication data provided by the user to the user encrypted message, wherein the password and the user unique identification code provided by the user are defined as a user key.

Physically, the user unique identification code can be replaced by a user encrypted key.

Physically, the password provided by the user is selected from the group consisted of text, number and clicked path code in movement.

Physically, the user identification code is selected from the group consisted of the number of the portable device and a user ID.

Physically, the trade information comprises at least a transaction time serial number, a transaction amount, a store ID based on conditions, and a transferring account number.

Physically, the barcode scanning device is a portable device with a camera lens, the camera lens of the portable device facing to the screen presenting the set of encrypted message barcode in order to let the image of the set of encrypted message barcodes be captured by the camera lens, the portable device can replace the barcode scanning device and the identification host.

Physically, the portable device is selected from the group consisted of smart phone and PDA.

Physically, the barcode scanning device is selected from the group consisted of camera with the function of capturing images as webcame and IPcam, image barcode scanner, laser barcode scanner, and CCD barcode scanner.

Physically, a concave and convex lens is disposed between the barcode scanning device and the portable device for actively adjusting a distance and then controlling dimensions of equipment.

Physically, the encrypted message barcode is selected from the group consisted of one-dimensional barcode, two-dimensional barcodes, QR code, or the combination of one-dimensional barcode, two-dimensional barcodes, QR code.

The active barcode authentication method comprises the steps of:

(1) a user operating an authentication program via a portable device;

(2) the user inputting a password via the portable device for producing encrypted message barcodes;

(3) providing the encrypted message barcodes from the portable device to the barcode scanning device so as to capture the image of the encrypted message barcodes, the image being then provided to an identification host of a store end for identification;

(4) after identifying and reading the encrypted message barcodes, the identification host of the store end encrypting the encrypted message barcodes to a store end encrypted message via a store end key;

(5) transmitting a store end code and the store end encrypted message to an authentication host via an SSL module, the authentication host decoding the store end code and the store is end encrypted message in order to gain initially encrypted related information; and (6) verifying whether the conditions of trade and authentication are conformed or not, if yes, proceeding following steps through identifying the user.

Physically, the encrypted message barcode is a one-time barcode, which is actively produced, instantaneous and records the image of the barcode of the encrypted message, such as OTP and one-time password, wherein the one-time barcode is only used once.

Physically, step (4) is to encrypt a user ID code, a user encrypted message and trade information to the store end encrypted message through the store end key.

Physically, in step (2) the encrypted message barcode is produced by that of using the password and a user unique identification code provided by the user as an encrypted key, encrypting a time marker and an authentication data to produce an encrypted message, and finally coding the encrypted message and the user ID code, thus the encrypted message barcode being presented on a screen of the portable device.

Physically, the user unique identification code can be replaced by a user encrypted key.

Physically, in step (5) the authentication host gains the store end key via the store end code and decodes the store end key to get trade information, a user ID code and a user encrypted message after receiving the store end code and the store end encrypted message, the authentication host gaining a user encrypted key via the user ID code and then decrypting the user encrypted key so as to gain user encrypted information and a time marker.

Physically, in step (5) trade is proceeded after the conditions of trade and authentication are conformed, the authentication and the trade information being sent back to the portable device after the trade, the way of sending back to the portable device can be using Internet or an SMS system for user to check.

Physically, in step (2) an adopted encrypted key before inputting the password and producing the encrypted message barcodes is a common key of a symmetrical encryption algorithm or an encrypted key of a asymmetrical encryption algorithm, the user determining how the trade is paid by quick payment or transfer transaction based on the amount of the trade and the timing and context of use.

Physically, if the user chooses the quick payment, only one time serial number being needed as user trade information, the user inputting the password in step (2) and using the password to be as the encrypted key after producing the user trade information, the encrypted key being used to encrypt the user trade information in order to produce a trade encrypted message.

Physically, if the user chooses the transfer transaction, a transaction time serial number, a transaction amount, a store ID is based on conditions, and a transferring account number being needed as user trade information, the user inputting the password in step (2) and using the password to be as the encrypted key after producing the user trade information, the password cooperates with the user unique ID code while the user is in registration or the encrypted key from an authentication center for encrypted keys, the encrypted keys are used to encrypt the user trade information in order to produce a trade encrypted message.

Physically, in step (5) the authentication host decrypts the encrypted message via a decryption key for gaining the trade information, so that the trade information provided by the store end and the trade information provided by the user are then compared to each other, the ID of the user is confirmed if yes.

Physically, in step (5) the decryption key is selected from the group consisted of password provided by the user, user unique identification code and user decryption key provided by a certification host.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts is throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1A:
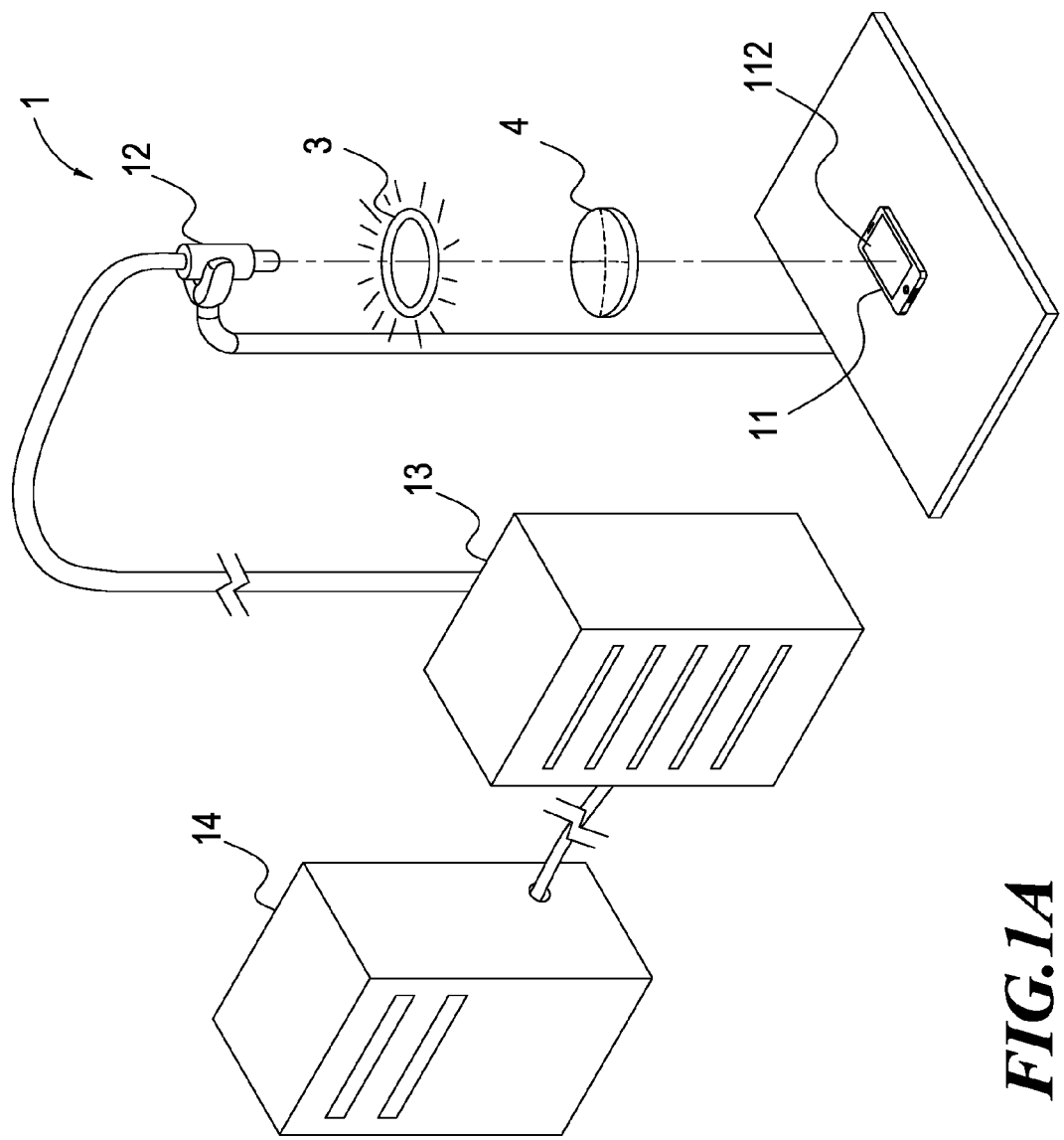
FIG. 1A illustrates a structural view of a first preferred embodiment of the active barcode authentication system and authentication method thereof of the present invention.
Figure 2:
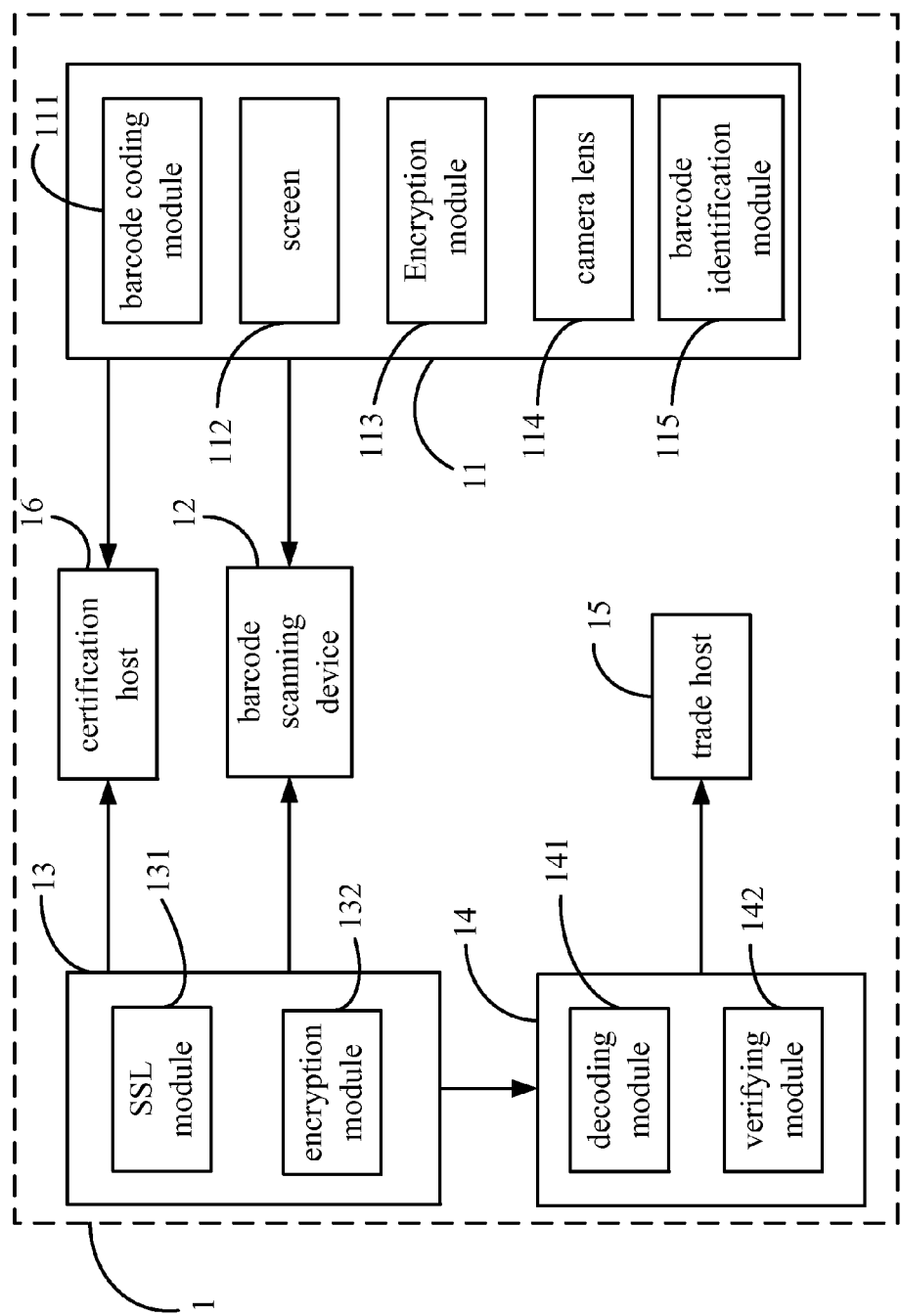
FIG. 2 illustrates a framework view of a first preferred embodiment of the active barcode authentication system and method thereof of the present invention.

With references to FIG. 1A and FIG. 2, which illustrates is a structural view and a framework view of a first preferred embodiment of the active barcode authentication system and method of the present invention. The active barcode authentication system 1 enables a store end to identify the ID of a user, wherein the store end has a store end key and a store end code, the system 1 includes a barcode scanning device 12 that reads plural barcodes, a portable device 11 with a screen 112, an identification host 13 that connects with the barcode scanning device 12, and an authentication host 14 that connects with the identification host 13; the portable device 11 has at least one barcode coding module 111, the screen 112, an encryption module 113, a camera lens 114, and a barcode identification module 115, wherein the encryption module 113 is able to encrypt a password as text, number and clicked path code in movement, a portable device identification code as an international portable device identification code that is not necessary but vary with different devices, a user unique identification code as a number of an SIM card of a portable device or a UUID representing user, a time marker, and an authentication data provided by the user to a user encrypted message, wherein the password, the portable device identification code and the user unique identification code provided by the user are defined as a user key; the barcode coding module 111 of the portable device 11 codes a user ID code, such as the number of a portable device or a user code, and a user encrypted message to encrypted message barcodes and presents the encrypted message barcodes on the screen 112 of the portable device 11, the screen 112 of the portable device 11 faces to the barcode scanning device 12 in order to let the image of the encrypted message barcodes on the screen 112 be captured by the barcode scanning device 12, the captured image of the encrypted message barcodes are transmitted to the identification host 13 having an encryption module 132 and an SSL (secure socket layer) module 131, if the user deals with the store end, trade information having a trade limit time and a transaction amount is thus produced, the encryption module 132 further encrypts the user identification code, the user encrypted message and the trade information to a store end encrypted message via the store end key; the identification host 13 transmits the store end code and the store end encrypted message to the authentication host 14 through the SSL module 131 (SSL and VPN), the authentication host 14 has a decoding module 141 and a verifying module 142, wherein the decoding module 141 decodes the store end encrypted message and the user encrypted message for gaining the initial information before encryption of the user and the verifying module 142 is to verify whether the user conforms to the conditions of trade and authentication or not, further, a trade host 15 proceeds to trade and produce the trade information.

Additionally, the present invention provides two kinds of keys, one is a common key of a symmetrical encryption algorithm, another one is an encrypted key of a asymmetrical encryption algorithm, wherein the symmetrical encryption algorithm adopts the user unique identification code and a password via self input as keys so as to encrypt a time serial number, so that a user authentication encrypted message is done, the keys is given to the authentication host 14 while the user registers the portable device 11. As shown in FIG. 1A, when the user carries the portable device 11 to a real store of the store end, the camera lens 114 reads a barcode with the real store information, then the barcode identification module 115 of the portable device 11 may analyzes the barcode to gain the account number of the real store and the transaction amount. Thereafter, the portable device 11 with an encrypted message barcode is disposed below the barcode scanning device 12 in order to directly scan the image of the encrypted message barcode on the screen 112 of the portable device 11. For the asymmetrical encryption algorithm, the authentication host 14 provides a set of documentation while the user registers the portable device 11; the authentication host 14 provides another set of documentation to the store end while the store end registers the information of the store. While in encryption, the user and the store end proceed the encryption via one set of encryption key of the documentation, on the other hand, another set of decryption key from the user and the store end is used by the authentication host 14 to proceed the decryption.

Figure 1B:
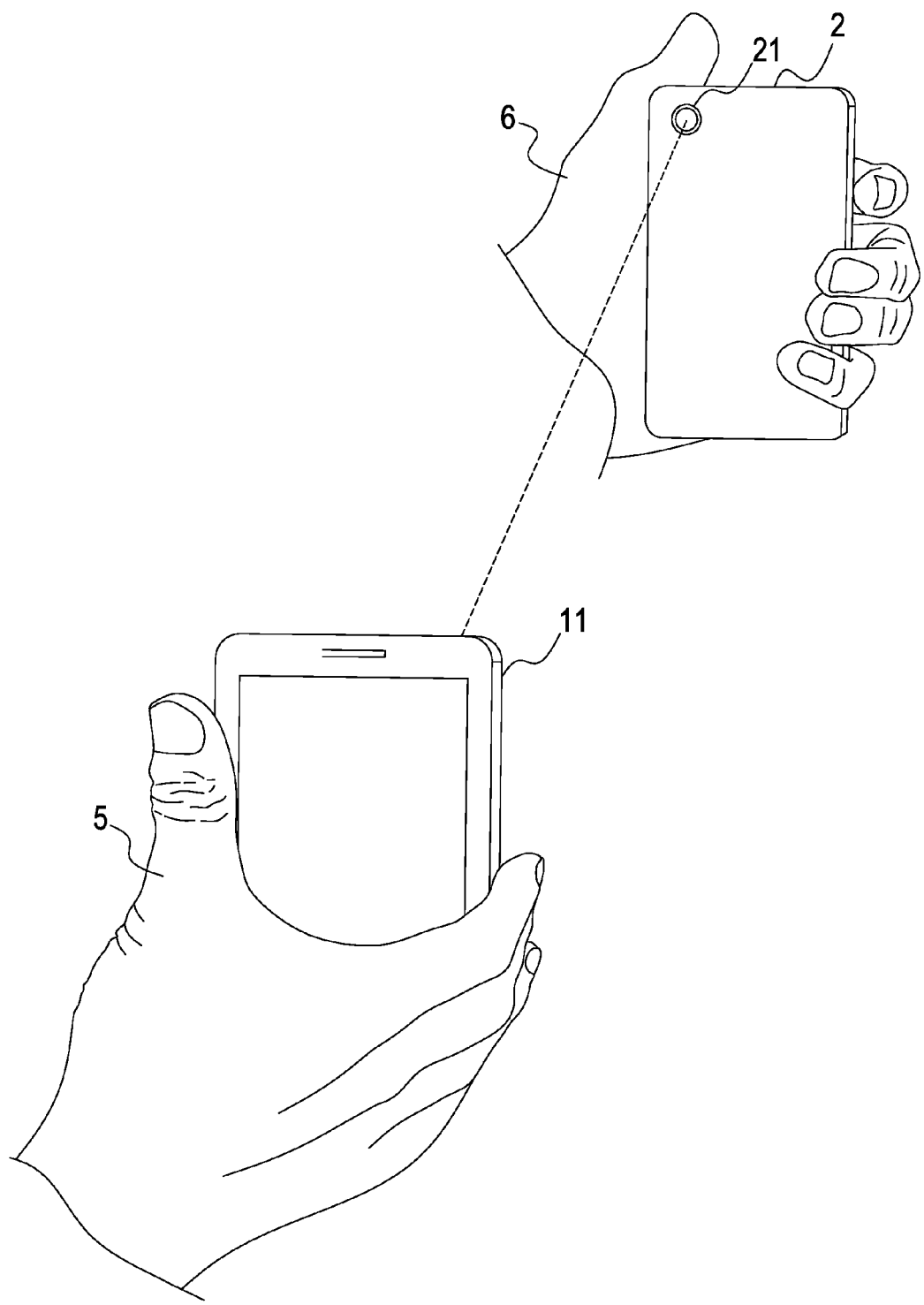
FIG. 1B illustrates a schematic application view of a second preferred embodiment of the active barcode authentication system and authentication method thereof of the present invention.

The barcode scanning device 12 of the store end and the identification host 13 can be a smart mobile device 2 with the camera lens 21. As shown in FIG. 1B, the employee 6 of the store end takes the smart mobile device 2 by hand to read the screen 112 of the mobile device 11. The smart mobile device 2 with the camera lens 21 has the barcode scanning device 12 and the identification host 13, further, a software is embedded in the smart mobile device 2 in order to solve that having no the barcode scanning device 12. The camera lens 21 of the smart mobile device 2 faces to the screen 112 presenting the encrypted message barcodes in order to let the image of the encrypted message barcodes on the screen 112 be captured by the camera lens 21. After identification, the next step can then be proceeded.

Additionally, the trade information of the user comprises at least a transaction time serial number, a transaction amount, a store ID based on conditions, and a transferring account number.

Additionally, a light source auxiliary 3 can be disposed between the smart mobile device 2 and the portable device 11.

A concave and convex lens 4 is disposed between the barcode scanning device 12 and the portable device 11 for actively adjusting a distance and then controlling dimensions of equipment.

Additionally, the MAC (media access control) address (card number) of the wireless network of the store end can be included in the user encrypted trade information while the store end is authenticated by the authentication host 14 so as to increase the strength of the authentication.

Figure 3:
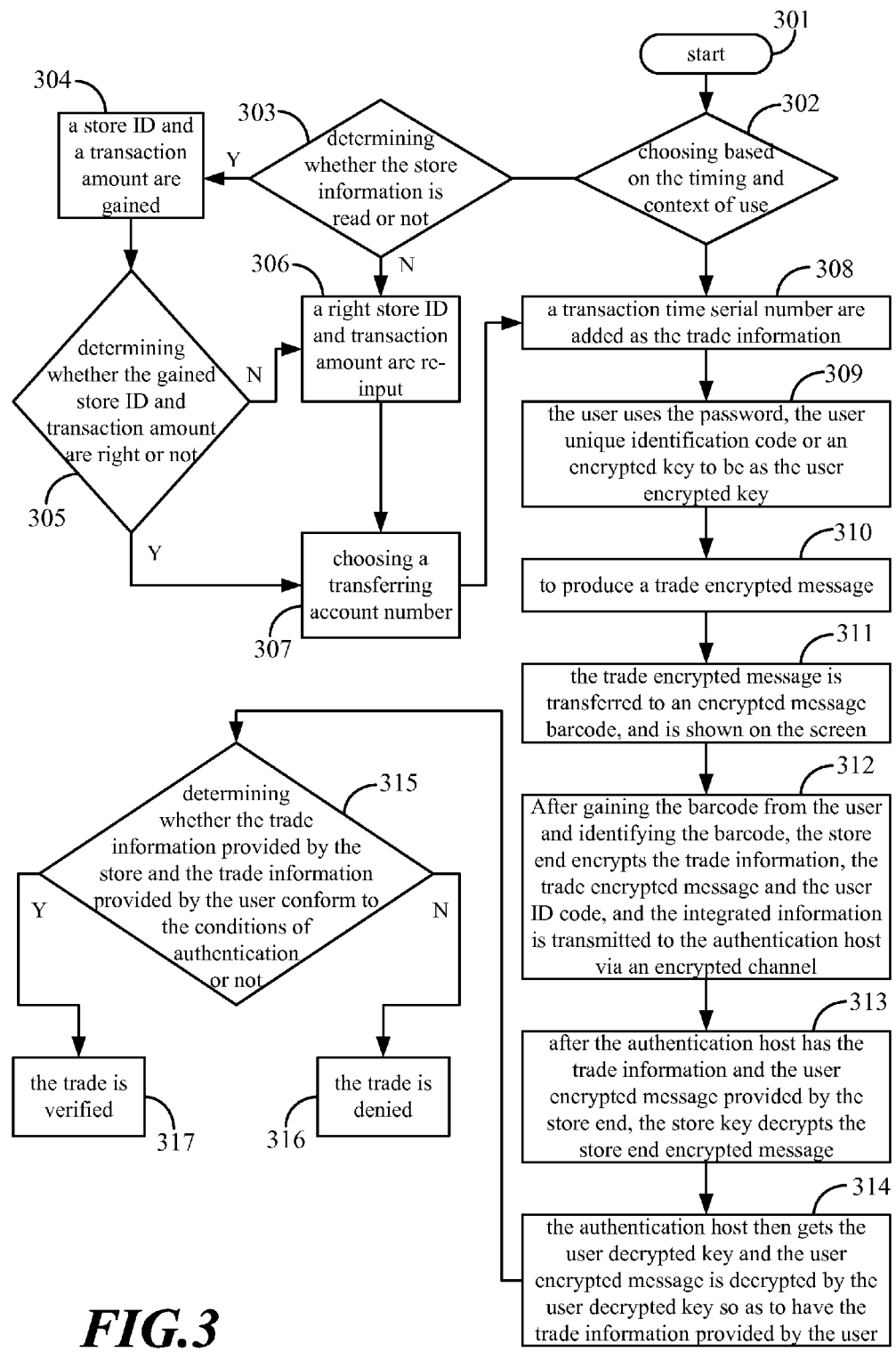
FIG. 3 illustrates a flow chart of authentication of the active barcode authentication system and method thereof of the present invention.

As shown in FIG. 3, which presents the determining procedures of the authentication method of the present invention. When the user operates an authentication program as step (301) via the portable device 11, the trade being added encrypted trade information or not may depend on the timing and context of use. If the user chooses the quick payment as step (308), a transaction time serial number is needed as user trade information. If the user chooses the transfer transaction, the camera lens 114 reading the store information as step (303) being the first procedure may be determined, if yes, then the camera lens 114 is activated to read the barcode. After identifying the barcode through the barcode identification module 115 of the portable device 11, a store ID and a transaction amount are gained as step (304). Thus, determining whether the gained store ID and transaction amount are right or not is proceeded as step (305), if no, a right store ID and transaction amount are re-input as step (306). After choosing a transferring account number as step (307), the store ID, the transaction amount, the transferring account number, and a transaction time serial number are added as the trade information as step (308). If the store information is not read by the camera lens 114, the right store ID and the transaction amount are directly input as step (306). Hence, the transferring account number is chosen as step (307).

The user inputs the password and uses the password, the user unique identification code or an encrypted key provided by a certification host 16 to be as the user encrypted key after producing the user trade information as step (309), the user encrypted key is thus used to encrypt the user trade information in order to produce a trade encrypted message as step (310). After that, the trade encrypted message with the user ID code is transferred to a barcode, and the barcode is shown on the screen 112 of the portable device 11 and is then disposed on the barcode identification module 115 of the store end for providing the barcode of the store end as step (311). After gaining the barcode from the user and identifying the barcode, the user ID code and the user trade encrypted message are gained. The store end encrypts the trade information (transaction amount), the trade encrypted message provided by the user and the user ID code via the store end key, continuously the store ID information is added as well, and the integrated information is transmitted to the authentication host 14 via an encrypted channel (SSL module 131; secure socket layer module 131) as step 312.

After the authentication host 14 has the store end encrypted message provided by the store end, the store key decrypts the store end encrypted message for gaining the trade information, the user ID code and the user encrypted message provided by the store end as step (313). The authentication host 14 then gets the user decrypted key through the user ID code, and the user encrypted message is decrypted by the user decrypted key so as to have the trade information provided by the user as step (314).

The authentication host 14 determines whether the trade information provided by the store and the trade information provided by the user conform to the conditions of authentication or not as step (315). If yes, the identification of the user is thus verified and the trade is verified as well as step (317). If no, the trade is denied since the information is unconfirmed as step (316).

Figure 4:
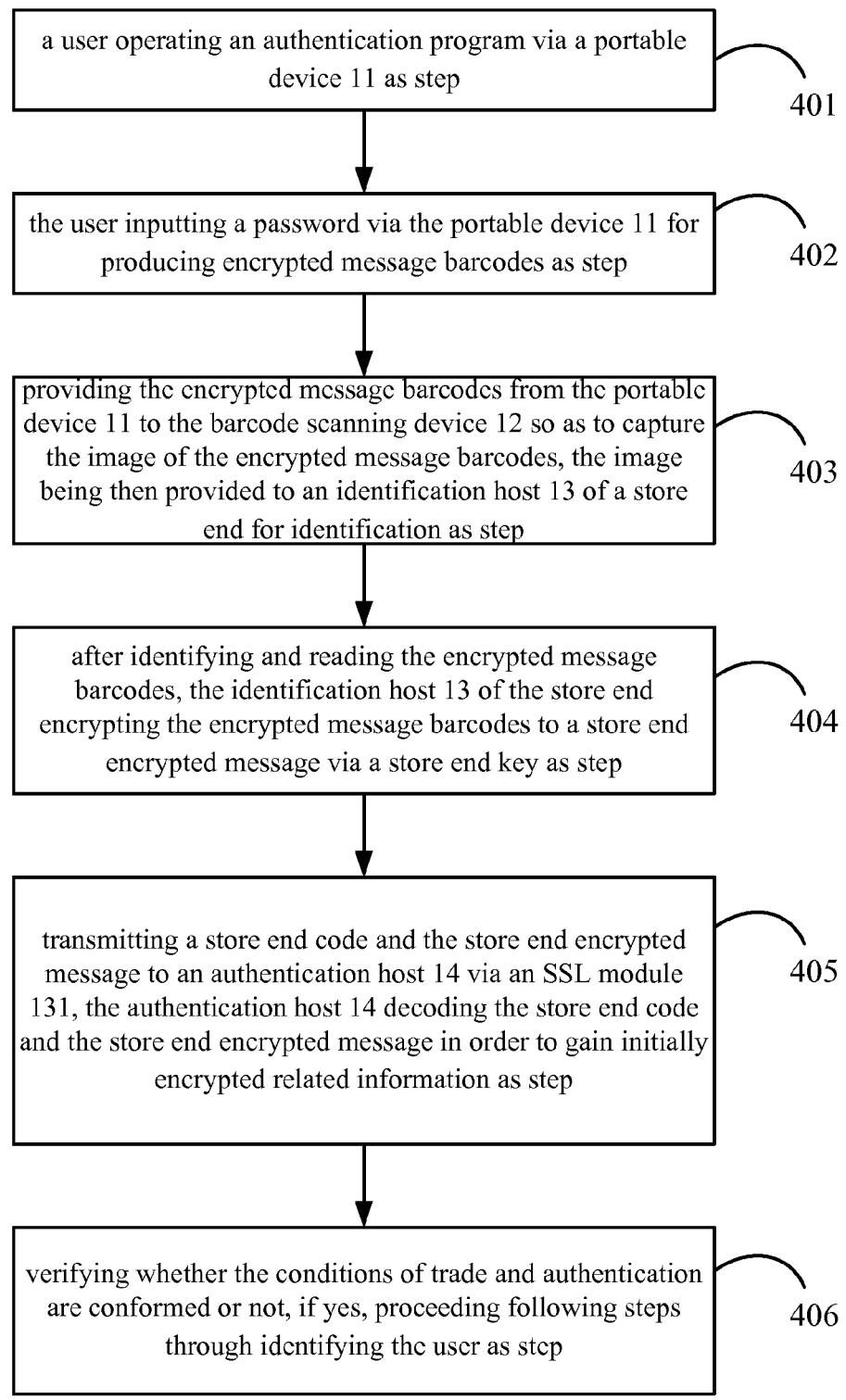
FIG. 4 illustrates a flow chart of the active barcode authentication system and method thereof of the present invention.

As aforesaid procedures of the authentication, the active barcode authentication method of the active barcode authentication system are shown in FIG. 4 and includes the steps of:
(1) a user operating an authentication program via a portable device 11 as step (401);
(2) the user inputting a password via the portable device 11 for producing encrypted message barcodes as step (402);
(3) providing the encrypted message barcodes from the portable device 11 to the barcode scanning device 12 so as to capture the image of the encrypted message barcodes, the image being then provided to an identification host 13 of a store end for identification as step (403);
(4) after identifying and reading the encrypted message barcodes, the identification host 13 of the store end encrypting the encrypted message barcodes to a store end encrypted message via a store end key as step (404);
(5) transmitting a store end code and the store end encrypted message to an authentication host 14 via an SSL module 131, the authentication host 14 decoding the store end code and the store end encrypted message in order to gain initially encrypted related information as step (405); and
(6) verifying whether the conditions of trade and authentication are conformed or not, if yes, proceeding following steps through identifying the user as step (406).

Additionally, in step (402), an adopted encrypted key before inputting the password and producing the encrypted message barcodes is a set of a user unique ID code that is defined in advance or an encrypted key provided by a certification host 16 in addition to that the input password is a set of key, the user determines how the trade is paid by quick payment or transfer transaction based on the amount of the trade and the timing and context of use, if the user chooses the quick payment, only one time serial number is needed as user trade information, if the user chooses the transfer transaction, a transaction time serial number, a transaction amount, a store ID based on conditions, and a transferring account number are needed as user trade information, the user inputs the password in step (402) and uses the password, the user unique ID code or the encrypted key provided by the certification host 16 to be as the encrypted key after producing the user trade information, the encrypted key is used to encrypt the user trade information in order to produce a trade encrypted message.

Further, in step (405), the authentication host 14 decrypts the encrypted message via a decryption key for gaining the trade information, so that the trade information provided by the store end and the trade information provided by the user are then compared to each other, the ID of the user being confirmed if yes.

Additionally, in step (405), once the conditions of the trade and the authentication are conformed, the trade is proceeded. After that, the authentication and the trade information are transmitted back to the portable device 11 of the user. The way of sending back to the portable device 11 can be is using Internet or SMS system for user to check, or provide the trade information to the user.

Additionally, the encrypted message barcode uses the password provided by the user and the user unique ID code to be as the encrypted key, and encrypts a time marker at the moment and the authentication information so as to produce an encrypted message, wherein the time marker is used to produce different encrypted messages with different time points for the purpose of hard decryption. Finally, the encrypted message and the user ID code are decoded to be an encrypted message barcode that is presented on the screen 112 of the portable device 11.

Additionally, the identification host 13 is able to encrypt the user ID code, the user encrypted message and the trade information to the store end encrypted message via the store end key, wherein the trade information are defined as the trade limit time produced by trade acts and the transaction amount.

Additionally, after the authentication host 14 receives the store end code and the store end encrypted message, the authentication host 14 may get the store end key through the store end code, and then decrypts the store end code so as to gain the trade information, the user ID code and the user encrypted message. Thereafter, the user decryption key may be grabbed from the user ID code, and the user decrypted key proceeds the decryption to the initial information while in the encryption of the user and the time marker.

Additionally, once the conditions of the trade and the authentication are conformed, the trade is proceeded. After that, the authentication and the trade information are transmitted back to the portable device 11 of a consumer 5. The way of sending back to the portable device 11 of a consumer 5 can be using Internet or SMS system for user to check, or provide the trade information to the consumer 5.

With comparisons to prior arts, the active barcode authentication system and the authentication method thereof of the present invention has the advantages listed below:
1. since each produced encrypted message is different than others and is only authenticated by a pointed time interval, thus the authentication code may be failed once the authentication is not in the pointed time interval, and the encrypted message barcode is only one-time usage and cannot be re-used for other users, so that the avoidance that decrypted information is copied or stolen to cause fake conditions of trade, ID confirmation, membership card, access control, attendance, etc. can be made.
2. Since the user encrypted information has a precise time marker, which makes each encrypted message be totally different via encryption algorithm.
3. The key provided by the present invention is a password input by the user, and the password is not recorded in the portable device, continuously, the password is necessary for each usage, so that there is another password to protect even if the portable device is lost.

4. The key provided of the present invention has the user unique ID code (UUID) that is the representative of a user, and the key is provided by device for each time. That is, the key will vary with different devices or account numbers. Through the confirmation of the key, the determination whether the device of the user proceeding the trade and the device that is initially in application are the same and the encrypted messages are the same or not can be sure.
5. In one aspect, the key of the present invention is defined by the user unique ID code provided by the user; but for another aspect, another asymmetrical encryption key provided by an impartial third party unit can also be the key of the user. Since the encryption key is provided by the impartial third party unit under the condition of confirming the user, the encryption key is definitely representative for the user and is not traced back, non-repudiation, etc. Via the asymmetrical key, a possibility for hackers may be lower, since an authentication center has no record for the encryption key of the user. The transplantation of the encryption key is thus increased as well. That is, the encryption key may be transmitted to a new portable device.
6. The user encrypted information may include an MAC address signal captured by the portable device so as to increase the strength of authentication, wherein the MAC address signal is included in the user trade information and is provided to the authentication host 14 for authentication.
7. The user encrypted information may have a transaction time serial number, a transaction amount, a store ID based on conditions, a transferring account number, etc. Trade strength and characteristics are the same as the general financial transfer, so it can be applied to a large amount of money or a more stringent payment environment.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. An active barcode authentication system that enables a store end to identify the ID of a user, wherein the store end has a store end key and a store end code, the system comprising:
    a barcode scanning device that reads plural barcodes;
    a portable device with a screen, the portable device having at least one barcode coding module, the barcode coding module coding a user ID code and a user encrypted message to at least one set of encrypted message barcodes and presenting the set of encrypted message barcodes on the screen of the portable device, the screen of the portable device facing to the barcode scanning device in order to let the image of the set of encrypted message barcodes on the screen be captured by the barcode scanning device;
    an identification host that connects with the barcode scanning device for identifying the image captured by the barcode scanning device and then gaining the user ID code and the user encrypted message, the identification host having at least one encryption module and an SSL (secure socket layer) module, wherein the encryption module encrypts the user ID code, the user encrypted message and trade information provided by the store end to a store end encrypted message via the store end key; and
    an authentication host that connects with the identification host, the identification host transmitting the store end code and the store end encrypted message to the authentication host through the SSL module, the authentication host having a decoding module and a verifying module, wherein the decoding module decodes the store end encrypted message and the user encrypted message for gaining the initial information before encryption of the user and the verifying module is to verify whether the user conforms to the conditions of trade and authentication or not.

2. The active barcode authentication system according to claim 1, wherein the portable device further comprises an encryption module, the encryption module is able to encrypt a password, a user unique identification code, a time marker, and an authentication data provided by the user to the user encrypted message, wherein the password and the user unique identification code provided by the user are defined as a user key.

3. The active barcode authentication system according to claim 2, wherein the user unique identification code can be replaced by a user encrypted key.

4. The active barcode authentication system according to claim 2, wherein the password provided by the user is selected from the group consisted of text, number and clicked path code in movement.

5. The active barcode authentication system according to claim 1, wherein the user identification code is selected from the group consisted of the number of the portable device and a user ID.

6. The active barcode authentication system according to claim 1, wherein the trade information comprises at least a transaction time serial number, a transaction amount, a store ID based on conditions, and a transferring account number.

7. The active barcode authentication system according to claim 1, wherein the portable device is selected from the group consisted of smart phone and PDA.

8. The active barcode authentication system according to claim 1, wherein the barcode scanning device is a portable device with a camera lens, the camera lens of the portable device facing to the screen presenting the set of encrypted message barcode in order to let the image of the set of encrypted message barcodes be captured by the camera lens, the portable device can replace the barcode scanning device and the identification host.

9. The active barcode authentication system according to claim 8, wherein the portable device is selected from the group consisted of smart phone and PDA.

10. The active barcode authentication system according to claim 1, wherein the barcode scanning device is selected from the group consisted of camera with the function of capturing images, image barcode scanner, laser barcode scanner, and CCD barcode scanner.

11. The active barcode authentication system according to claim 1, wherein a concave and convex lens is disposed between the barcode scanning device and the portable device for actively adjusting a distance and then controlling dimensions of equipment.

12. The active barcode authentication system according to claim 1, wherein the encrypted message barcode is selected from the group consisted of one-dimensional barcode, two-dimensional barcodes, QR code, or the combination of one-dimensional barcode, two-dimensional barcodes, QR code.

13. An active barcode authentication method comprising the steps of:
    (1) a user operating an authentication program via a portable device;
    (2) the user inputting a password via the portable device for producing encrypted message barcodes;
    (3) providing the encrypted message barcodes from the portable device to the barcode scanning device so as to capture the image of the encrypted message barcodes, the image being then provided to an identification host of a store end for identification;

(4) after identifying and reading the encrypted message barcodes, the identification host of the store end encrypting the encrypted message barcodes to a store end encrypted message via a store end key;

(5) transmitting a store end code and the store end encrypted message to an authentication host via an SSL module, the authentication host decoding the store end code and the store end encrypted message in order to gain initially encrypted related information; and (6) verifying whether the conditions of trade and authentication are conformed or not, if yes, proceeding following steps through identifying the user.

14. The active barcode authentication method according to claim 13, wherein the encrypted message barcode is a one-time barcode, which is actively produced, instantaneous and records the image of the barcode of the encrypted message.

15. The active barcode authentication method according to claim 13, wherein step (4) is to encrypt a user ID code, a user encrypted message and trade information to the store end encrypted message through the store end key.

16. The active barcode authentication method according to claim 15, wherein in step (5) the authentication host gains the store end key via the store end code and decodes the store end key to get trade information, a user ID code and a user encrypted message after receiving the store end code and the store end encrypted message, the authentication host gaining a user encrypted key via the user ID code and then decrypting the user encrypted key so as to gain user encrypted information and a time marker.

17. The active barcode authentication method according to claim 15, wherein in step (5) trade is proceeded after the conditions of trade and authentication are conformed, the authentication and the trade information being sent back to the portable device after the trade, the way of sending back to the portable device can be using Internet or an SMS system for user to check.

18. The active barcode authentication method according to claim 15, wherein in step (2) an adopted encrypted key before inputting the password and producing the encrypted message barcodes is a common key of a symmetrical encryption algorithm or an encrypted key of a asymmetrical encryption algorithm, the user determining how the trade is paid by quick payment or transfer transaction based on the amount of the trade and the timing and context of use.

19. The active barcode authentication method according to claim 18, wherein if the user chooses the quick payment, only one time serial number being needed as user trade information, the user inputting the password in step (2) and using the password to be as the encrypted key after producing the user trade information, the encrypted key being used to encrypt the user trade information in order to produce a trade encrypted message.

20. The active barcode authentication method according to claim 19, wherein in step (5) the authentication host decrypts the encrypted message via a decryption key for gaining the trade information, so that the trade information provided by the store end and the trade information provided by the user are then compared to each other, the ID of the user being confirmed if yes.

21. The active barcode authentication method according to claim 18, wherein if the user chooses the transfer transaction, a transaction time serial number, a transaction amount, a store ID based on conditions, and a transferring account number being needed as user trade information, the user inputting the password in step (2) and using the password to be as the encrypted key after producing the user trade information, the encrypted key being used to encrypt the user trade information in order to produce a trade encrypted message.

22. The active barcode authentication method according to claim 21, wherein in step (5) the authentication host decrypts the encrypted message via a decryption key for gaining the trade information, so that the trade information provided by the store end and the trade information provided by the user are then compared to each other, the ID of the user being confirmed if yes.

23. The active barcode authentication method according to claim 22, wherein in step (5) the decryption key is selected from the group consisted of password provided by the user, user unique identification code and user decryption key provided by a certification host.

24. The active barcode authentication method according to claim 13, wherein in step (2) the encrypted message barcode is produced by that of using the password and a user unique is identification code provided by the user as an encrypted key, encrypting a time marker and an authentication data to produce an encrypted message, and finally coding the encrypted message and the user ID code, thus the encrypted message barcode being presented on a screen of the portable device.

25. The active barcode authentication method according to claim 24, wherein the user unique identification code can be replaced by a user encrypted key.

* * * * *